(12) United States Patent
Beck et al.

(10) Patent No.: US 11,851,178 B2
(45) Date of Patent: Dec. 26, 2023

(54) LONG RANGE ENDURANCE AERO PLATFORM SYSTEM

(71) Applicant: The Aerospace Corporation, El Segundo, CA (US)

(72) Inventors: Steven Beck, Palos Verdes Estates, CA (US); David Caldwell, Carlsbad, CA (US); Christopher Hartney, Gardena, CA (US); Bernard Harris Jefferson, Jr., Westminster, CA (US); Jeffrey Lang, Torrance, CA (US); John Morales, Victorville, CA (US); Martin Panevsky, San Pedro, CA (US); Kasemsan Siri, Torrance, CA (US); Evan Ulrich, Hermosa Beach, CA (US); Richard Welle, Huntington Beach, CA (US); Allyson Yarbrough, Rancho Palos Verdes, CA (US)

(73) Assignee: The Aerospace Corporation, El Segundo, CA (US)

( * ) Notice: Subject to any disclaimer, the term of this patent is extended or adjusted under 35 U.S.C. 154(b) by 495 days.

(21) Appl. No.: 16/791,605

(22) Filed: Feb. 14, 2020

(65) Prior Publication Data

US 2021/0253240 A1    Aug. 19, 2021

(51) Int. Cl.
*B64C 39/02* (2023.01)
*B64U 10/13* (2023.01)
(Continued)

(52) U.S. Cl.
CPC ............ *B64C 39/024* (2013.01); *B64U 10/13* (2023.01); *B64U 30/20* (2023.01); *B64U 50/11* (2023.01);
(Continued)

(58) Field of Classification Search
CPC ............ B64C 39/024; B64C 2201/027; B64C 2201/042; B64C 2201/044; B64C 2201/108; B64C 2201/162; B64C 2201/165; B64C 27/20; B64C 2201/104; B64C 29/02; B64C 39/062; B64C 27/22; B64C 2201/021; B64C 2201/024; B64D 27/24; B64D 27/08; B64D 2027/026; Y02T 50/60; B64U 10/13; B64U 30/20; B64U 50/11; B64U 50/13; B64U 50/14;
(Continued)

(56) References Cited

U.S. PATENT DOCUMENTS 3,002,712 A * 10/1961 Beckwith ................ B64C 27/20
244/17.23
4,037,807 A *  7/1977 Johnston ............... B64C 39/024
244/34 A (Continued)

*Primary Examiner* — Medhat Badawi
(74) *Attorney, Agent, or Firm* — LeonardPatel PC

(57) ABSTRACT

An unmanned aerial vehicle (UAV) that provides increased operational flight endurance and efficiency. The UAV includes a power generation system, which includes an internal combustion engine and one or more batteries (batteries). The power generation system is configured to generate power for propulsion of the UAV. The internal combustion engine is configured to power a lift propeller, generating vertical lift of the UAV, and the batteries are configured to power a micro-propeller assembly, propelling the UAV in a forward direction or multiple additional directions.

27 Claims, 10 Drawing Sheets

(51) Int. Cl.
  *B64U 30/20* (2023.01)
  *B64U 50/11* (2023.01)
  *B64U 50/13* (2023.01)
  *B64U 50/14* (2023.01)
  *B64U 50/19* (2023.01)

(52) U.S. Cl.
  CPC .............. *B64U 50/13* (2023.01); *B64U 50/14* (2023.01); *B64U 50/19* (2023.01)

(58) Field of Classification Search
  CPC ........ B64U 50/19; B64U 10/10; B64U 10/25; B64U 30/10
  See application file for complete search history.

(56) References Cited

U.S. PATENT DOCUMENTS

| | | | | |
|---|---|---|---|---|
| 4,678,141 A * | | 7/1987 | Sarrantonio | B64C 37/02 244/63 |
| 4,795,111 A * | | 1/1989 | Moller | B64C 27/20 244/100 R |
| 5,297,759 A * | | 3/1994 | Tilbor | B64C 27/16 244/17.11 |
| 6,604,706 B1 * | | 8/2003 | Bostan | B64C 17/06 244/6 |
| 6,691,949 B2 * | | 2/2004 | Plump | B64C 39/024 244/34 A |
| 7,032,861 B2 * | | 4/2006 | Sanders, Jr. | B64C 39/024 244/12.1 |
| 7,484,687 B2 * | | 2/2009 | Martin | B64D 35/04 244/4 A |
| 7,497,759 B1 * | | 3/2009 | Davis | A63H 27/12 446/454 |
| 7,658,346 B2 * | | 2/2010 | Goossen | B64C 39/024 244/17.11 |
| 7,681,832 B2 * | | 3/2010 | Colclough | B64C 27/20 244/49 |
| 7,712,701 B1 * | | 5/2010 | Ehrmantraut | B64C 39/024 244/17.23 |
| 7,794,302 B2 * | | 9/2010 | Davis | A63H 27/12 446/454 |
| 8,113,905 B2 * | | 2/2012 | Davis | A63H 27/12 446/46 |
| 8,205,820 B2 * | | 6/2012 | Goossen | B64C 39/024 244/110 E |
| 8,251,307 B2 * | | 8/2012 | Goossen | B64D 1/22 244/76 R |
| 8,297,361 B1 * | | 10/2012 | Root | E21B 43/0122 166/344 |
| 8,505,846 B2 * | | 8/2013 | Sanders, II | B64C 11/003 244/7 B |
| 8,695,919 B2 * | | 4/2014 | Shachor | B64C 39/022 244/17.11 |
| 8,720,814 B2 * | | 5/2014 | Smith | B64D 17/62 244/12.4 |
| 8,919,691 B2 * | | 12/2014 | Lindmark | B63B 39/06 244/101 |
| 9,004,973 B2 * | | 4/2015 | Condon | A63H 17/32 446/37 |
| 9,663,237 B2 * | | 5/2017 | Senkel | B64C 27/473 |
| 9,688,396 B2 * | | 6/2017 | Avery, III | B64C 1/0009 |
| 9,764,828 B2 * | | 9/2017 | Ulrich | G01W 1/08 |
| 9,902,493 B2 * | | 2/2018 | Simon | B64C 39/024 |
| 9,908,619 B1 * | | 3/2018 | Beckman | B64C 39/024 |
| 9,908,632 B1 * | | 3/2018 | Kimchi | B64C 1/30 |
| 9,975,633 B1 * | | 5/2018 | Johnson | B64C 7/02 |
| 10,011,353 B1 * | | 7/2018 | Beckman | G05D 1/0858 |
| 10,399,666 B2 * | | 9/2019 | Beckman | B64C 11/48 |
| 10,526,070 B2 * | | 1/2020 | Beckman | B64C 11/28 |
| 10,604,241 B1 * | | 3/2020 | Dong | B64C 27/16 |
| 10,669,020 B2 * | | 6/2020 | Vuong | B64C 11/001 |
| 11,007,290 B2 * | | 5/2021 | Kreitenberg | A61L 2/10 |
| 11,091,265 B1 * | | 8/2021 | Newsted | B64D 1/08 |
| 11,142,314 B2 * | | 10/2021 | Hada | B64C 39/024 |
| 11,192,633 B1 * | | 12/2021 | Moro-Ludena | B64C 29/02 |
| 2002/0104921 A1 * | | 8/2002 | Louvel | A63H 27/12 244/12.1 |
| 2003/0006339 A1 * | | 1/2003 | Capanna | B64C 29/02 244/7 R |
| 2004/0067317 A1 * | | 4/2004 | Gorman | C23C 4/14 427/446 |
| 2006/0231675 A1 * | | 10/2006 | Bostan | B64C 27/20 244/12.1 |
| 2007/0221790 A1 * | | 9/2007 | Goossen | G01P 5/14 244/53 B |
| 2010/0032947 A1 * | | 2/2010 | Bevirt | F03D 1/065 290/55 |
| 2010/0106398 A1 * | | 4/2010 | Eisele | G01C 21/00 701/532 |
| 2010/0301168 A1 * | | 12/2010 | Raposo | G05D 1/0858 244/171.2 |
| 2011/0042509 A1 * | | 2/2011 | Bevirt | B64C 29/0033 244/12.4 |
| 2011/0062278 A1 * | | 3/2011 | Ulrich | B64C 39/024 244/48 |
| 2011/0084162 A1 * | | 4/2011 | Goossen | B64D 1/22 244/135 C |
| 2013/0105635 A1 * | | 5/2013 | Alzu'bi | B64C 39/024 244/23 A |
| 2013/0206919 A1 * | | 8/2013 | Shachor | B64C 39/024 244/23 A |
| 2014/0034775 A1 * | | 2/2014 | Hutson | F16M 11/123 244/17.23 |
| 2015/0012154 A1 * | | 1/2015 | Senkel | B64C 27/473 701/4 |
| 2016/0244157 A1 * | | 8/2016 | Welsh | B62D 63/04 |
| 2016/0340028 A1 * | | 11/2016 | Datta | B64C 15/12 |
| 2016/0376014 A1 * | | 12/2016 | Alnafisah | B64C 39/024 244/39 |
| 2017/0015417 A1 * | | 1/2017 | Bishop | B64C 27/82 |
| 2017/0247107 A1 * | | 8/2017 | Hauer | B64C 39/024 |
| 2017/0369162 A1 * | | 12/2017 | Alzahrani | B64C 29/0033 |
| 2018/0029703 A1 * | | 2/2018 | Simon | B64C 27/10 |
| 2018/0044000 A1 * | | 2/2018 | Venturelli | B60L 53/12 |
| 2018/0118326 A1 * | | 5/2018 | Stockett | B64C 1/12 |
| 2018/0362157 A1 * | | 12/2018 | Teetzel | B64U 30/20 |
| 2018/0369847 A1 * | | 12/2018 | Kihm | A61L 9/14 |
| 2019/0028133 A1 * | | 1/2019 | Stroppiana | H04M 1/04 |
| 2019/0084432 A1 * | | 3/2019 | Liang | B64U 30/20 |
| 2019/0100302 A1 * | | 4/2019 | Ulrich | B64C 27/82 |
| 2019/0341592 A1 * | | 11/2019 | Linde | B64D 27/24 |
| 2020/0255128 A1 * | | 8/2020 | Suppes | B64D 27/24 |
| 2020/0283134 A1 * | | 9/2020 | Mores | B64C 27/10 |
| 2020/0317357 A1 * | | 10/2020 | Demont | H01M 50/358 |
| 2020/0327814 A1 * | | 10/2020 | Adolf | B64C 29/0025 |
| 2020/0331621 A1 * | | 10/2020 | Gomez | B64D 31/06 |
| 2021/0061482 A1 * | | 3/2021 | Ulrich | B64D 35/06 |
| 2021/0221526 A1 * | | 7/2021 | Van Bavel | B64D 27/24 |
| 2021/0253240 A1 * | | 8/2021 | Beck | B64C 27/22 |
| 2021/0323691 A1 * | | 10/2021 | Foster | B64D 27/04 |
| 2021/0339881 A1 * | | 11/2021 | Bevirt | B60L 58/18 |
| 2022/0081109 A1 * | | 3/2022 | Fujiwara | B63H 1/16 |
| 2022/0119102 A1 * | | 4/2022 | Shaanan | B64D 35/02 |

* cited by examiner

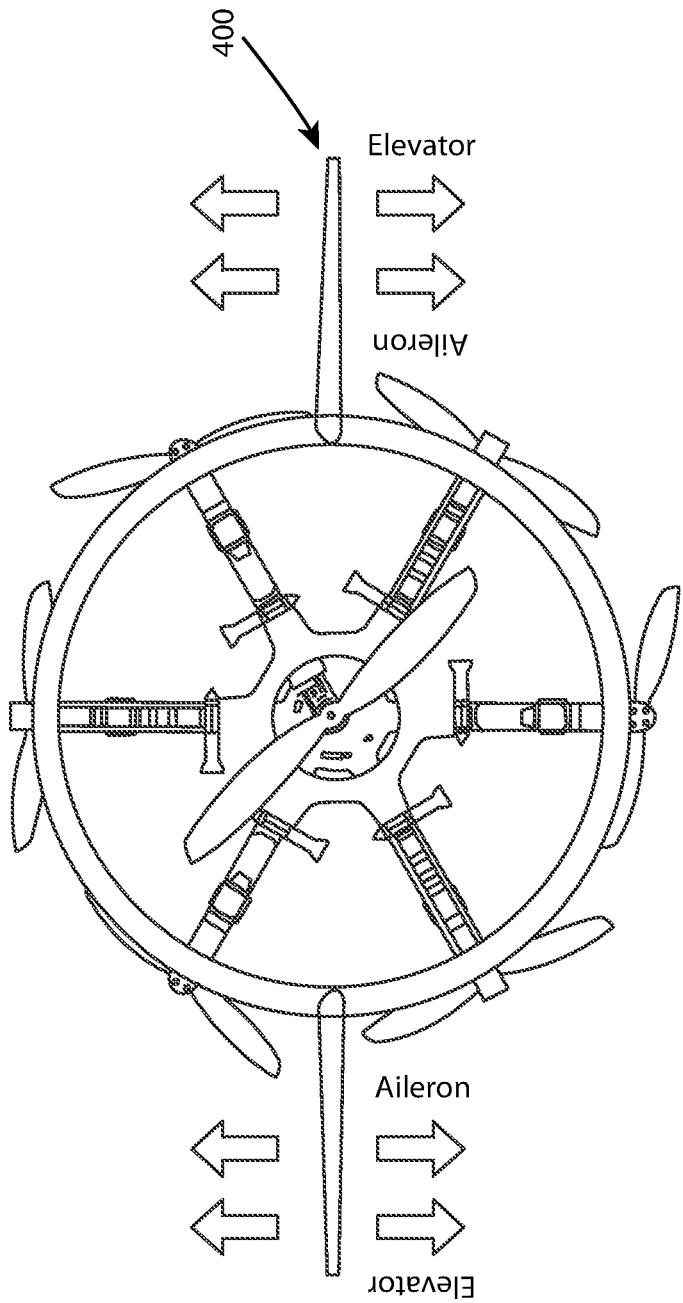

LONG RANGE ENDURANCE AERO PLATFORM SYSTEM

FIELD

The present invention relates to aerospace platform systems, and more particularly, to an unmanned aerial vehicle (UAV) system that provides increased operational flight endurance and efficiency.

BACKGROUND

Currently, state-of-the-art UAV systems utilize a single type of power source to maintain flight, i.e., a battery. Most UAVs utilize battery packs based on Lithium chemistry, namely, Lithium (Li) ion technology. Depending on variables such as the weight of the payload onboard and wind conditions, Lithium ion battery capacities enable flight times between ~10 minutes and one hour. During flight operations, the remote pilot in control (PIC) of the UAV must constantly monitor battery status so that the UAV can be landed before the battery completely discharges. Upon landing, in order to continue the mission, the remote PIC must either replace the batteries with fresh ones or recharge the batteries. This commonly used practice disrupts operations and adds cost and complexity associated with the need for multiple battery packs.

Similarly, another class of remotely piloted UAVs utilize an internal combustion engine to power flight. Typically, the fuel tank of these UAVs is limited in size and permits flights of ~30 minutes, depending on the payload and wind conditions. For extended missions, the remote PIC must land the UAV to re-fuel, again disrupting operations, as with the battery-only UAV. In both of these configurations, the power source depletes during operation and the operator has no choice but to land the UAV and disrupt the mission to re-charge batteries or re-fill the fuel tank.

Accordingly, an improved UAV with increased operational flight endurance and efficiency may be beneficial.

SUMMARY

Certain embodiments of the present invention may provide solutions to the problems and needs in the art that have not yet been fully identified, appreciated, or solved by current UAV technologies. For example, some embodiments of the present invention pertain to a UAV with controlled hovering flight, autorotation, and efficient forward flight. Further, the UAV in some embodiments provides the capability to replenish the power source while in flight, through a combined alternator and internal combustion engine that re-charges the batteries while in flight. This combination extends the flight time of the vehicle, and thus, the duration of the mission.

In an embodiment, an UAV includes a power generation system, which includes an internal combustion engine and one or more batteries (batteries). The power generation system is configured to generate power for propulsion of the UAV. The internal combustion engine is configured to power a lift propeller, generating vertical lift of the UAV, and the batteries are configured to power a micro-propeller assembly, propelling the UAV in a forward direction or multiple additional directions.

In another embodiment, an UAV includes a power generation system that includes a liquid-fuel based internal combustion engine and one or more batteries to power the UAV. The power generation system is configured to generate power for propulsion of the UAV and charge the one or more batteries. The UAV includes a centrally housed ducted fan comprising a variable pitch lift propeller configured to provide lift to the UAV and autorotate the UAV when power to the ducted fan is eliminated.

In yet another embodiment, an UAV includes a power generation system configured to provide power to a lift propeller. The lift propeller is configured to generate vertical lift of the UAV. The UAV also includes a micro-propeller assembly configured to propel the UAV in a forward direction or multiple additional directions. The micro-propeller assembly includes a plurality of micro-propellers, each of which are distributed symmetrically around an upper portion of a centrally housed duct fan.

BRIEF DESCRIPTION OF THE DRAWINGS

In order that the advantages of certain embodiments of the invention will be readily understood, a more particular description of the invention briefly described above will be rendered by reference to specific embodiments that are illustrated in the appended drawings. While it should be understood that these drawings depict only typical embodiments of the invention and are not therefore to be considered to be limiting of its scope, the invention will be described and explained with additional specificity and detail through the use of the accompanying drawings, in which:

FIGS. 4A-D illustrates a lifting wing for the UAV, according to an embodiment of the present invention.

DETAILED DESCRIPTION OF THE EMBODIMENTS

Figure 1:
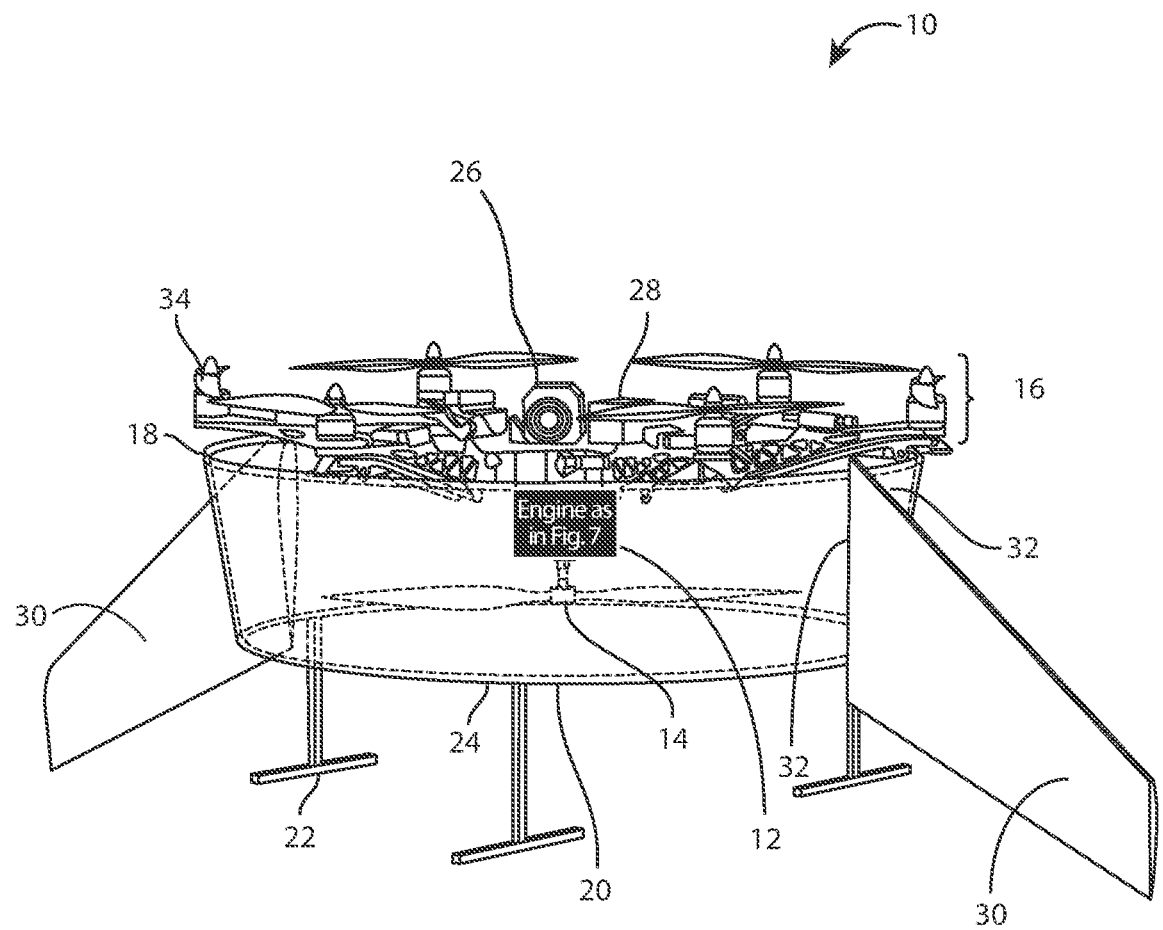
FIG. 1 illustrates a side perspective view of an UAV system, according to an embodiment of the present invention.

Some embodiments generally pertain to UAVs, and specifically, to an UAV with controlled hovering flight, autorotation, and efficient forward flight. For example, the UAV incorporates a unique and non-obvious technique to increase the UAV's operational flight time as compared to conventional systems. Unlike traditional UAVs, where design-specific capabilities relating to vertical take-off and landing (VTOL) constrain the platform in ways that limit flight endurance, the UAV in some embodiments combines VTOL capabilities with fixed-wing flight endurance and multi-rotor controllability functionality and/or a unique power generation system to enable long endurance and high efficiency flight.

The UAV may include multiple subsystems for power, propulsion, stability, and attitude control. For example, the UAV includes a unique power generation system that combines a liquid-fuel based internal combustion engine and one or more on-board batteries to power the UAV. For purposes of explanation only, on-board batteries will be referred to as "batteries". The power generation system generates power for propulsion of the UAV as well as for charging of one or more batteries. In an embodiment, the batteries generate a charge to power the avionics, processor(s), and attitude control mechanisms of the UAV.

In certain embodiments, the UAV achieves vertical hovering flight through the use of a centrally housed ducted fan. For example, the centrally housed ducted fan utilizes a variable pitch lift propeller. The variable pitch lift propeller may provide lift and enable autorotation when power to the ducted fan is eliminated either intentionally or through a system fault. A pair of wings symmetrically placed around an exterior surface of the centrally housed ducted fan allows for forward flight. The UAV achieves precision maneuvering in forward flight through the use of control surfaces (e.g., elevators, ailerons, or elevons) embedded within the structure of the wings.

During hovering or slow-moving forward flight, precision control is achieved through the use of a micro-propeller assembly. The micro-propeller assembly may include a plurality of micro-propellers, each of which have electric motors that are distributed symmetrically around (and coupled at or near) an upper portion of the centrally housed duct fan assembly. The symmetrical distribution of the electric motors ensures weight balance and stability. The centrally housed duct fan assembly may include a duct and lift propeller.

Additionally, in some embodiments, the UAV includes a lift propeller that may, among other things, provide the benefit of autorotation in the event of engine failure or malfunction during flight. In the scenario where the UAV is out of fuel and the UAV is oriented such that the lift propeller begins to spin up, the rotational rate of the lift propeller may increase as the UAV descends. The rotational energy in this example is transferred to the battery by increasing the angle of attack of the lift propeller. The increase in the angle of attack produces a large upward force which arrests the fall and decreases the amount of damage that may be sustained by the UAV and people or property in its path of descent.

Even in normal landing situations, the UAV may autorotate such that the energy from the rotational rate of the lift propeller is transferred into the batteries. This is accomplished by the flow of air past the lift propeller, which drives the shaft of power generation system 12, thus charging the batteries. The benefit in this example is that the batteries may then possess charge when the UAV lands.

Figure 2:
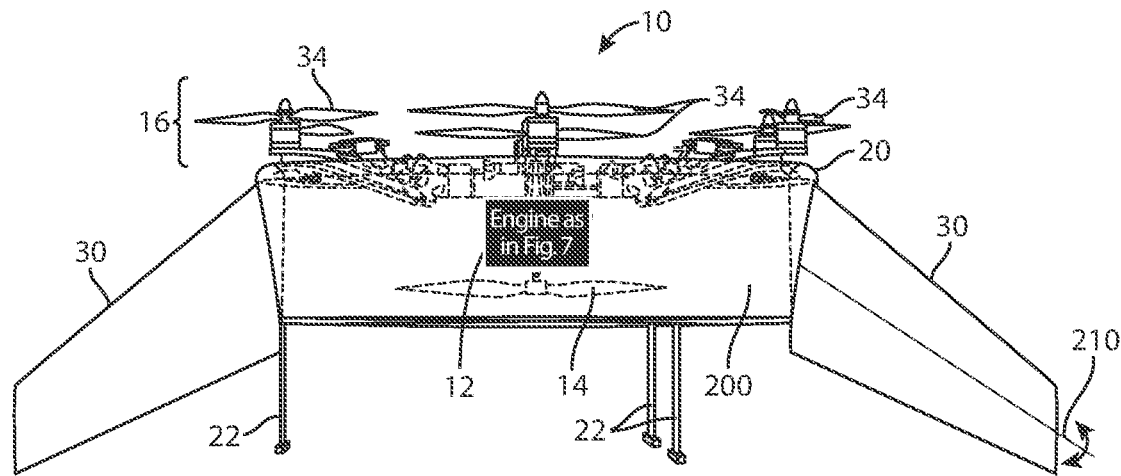
FIG. 2 illustrates a side view of the UAV, according to an embodiment of the present invention.
Figure 3:
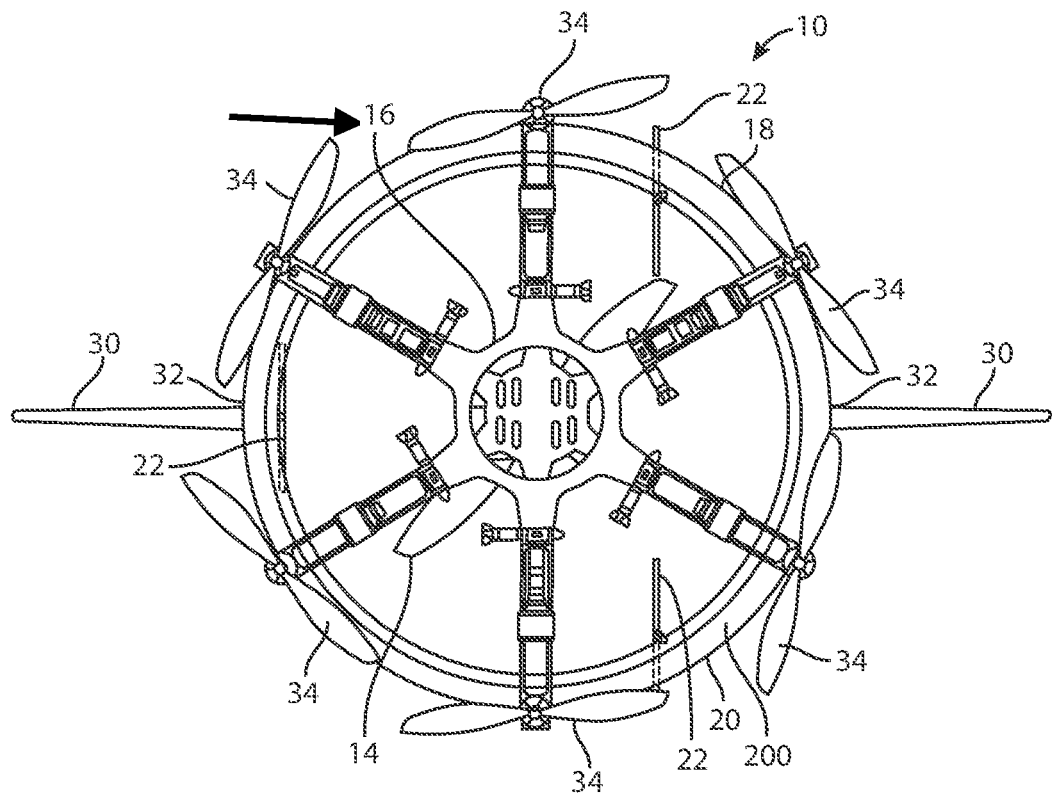
FIG. 3 illustrates a top view of the UAV, according to an embodiment of the present invention.
Figure 4A:
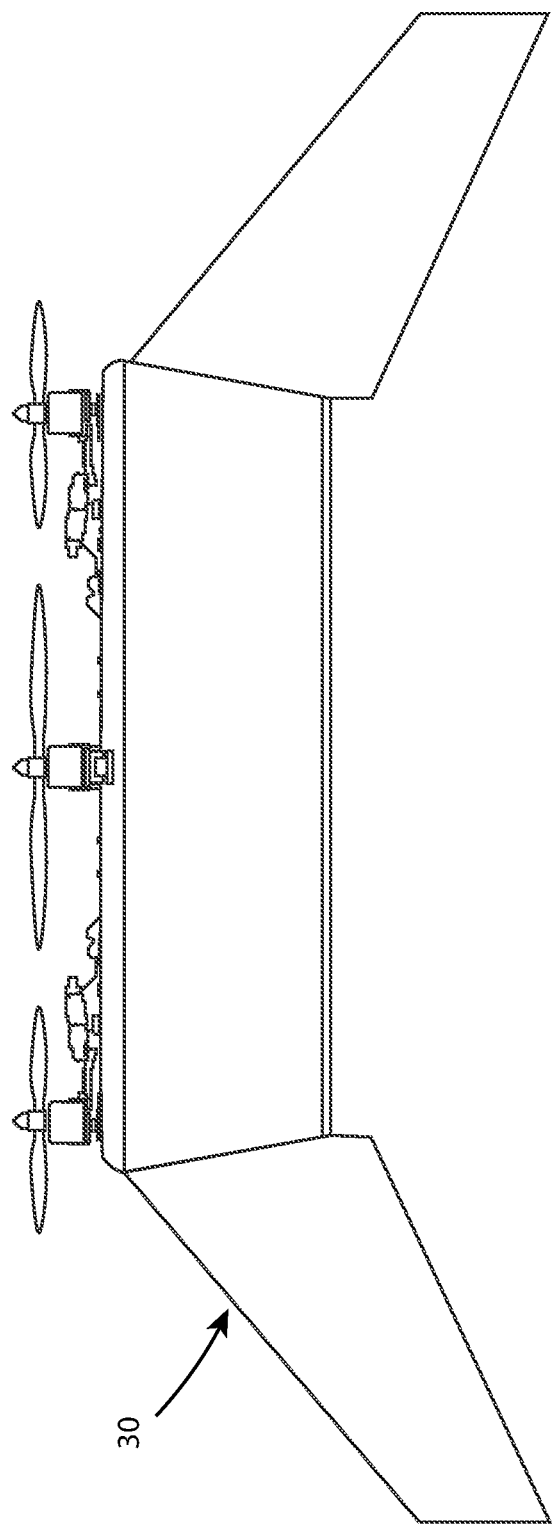
Figure 4C:
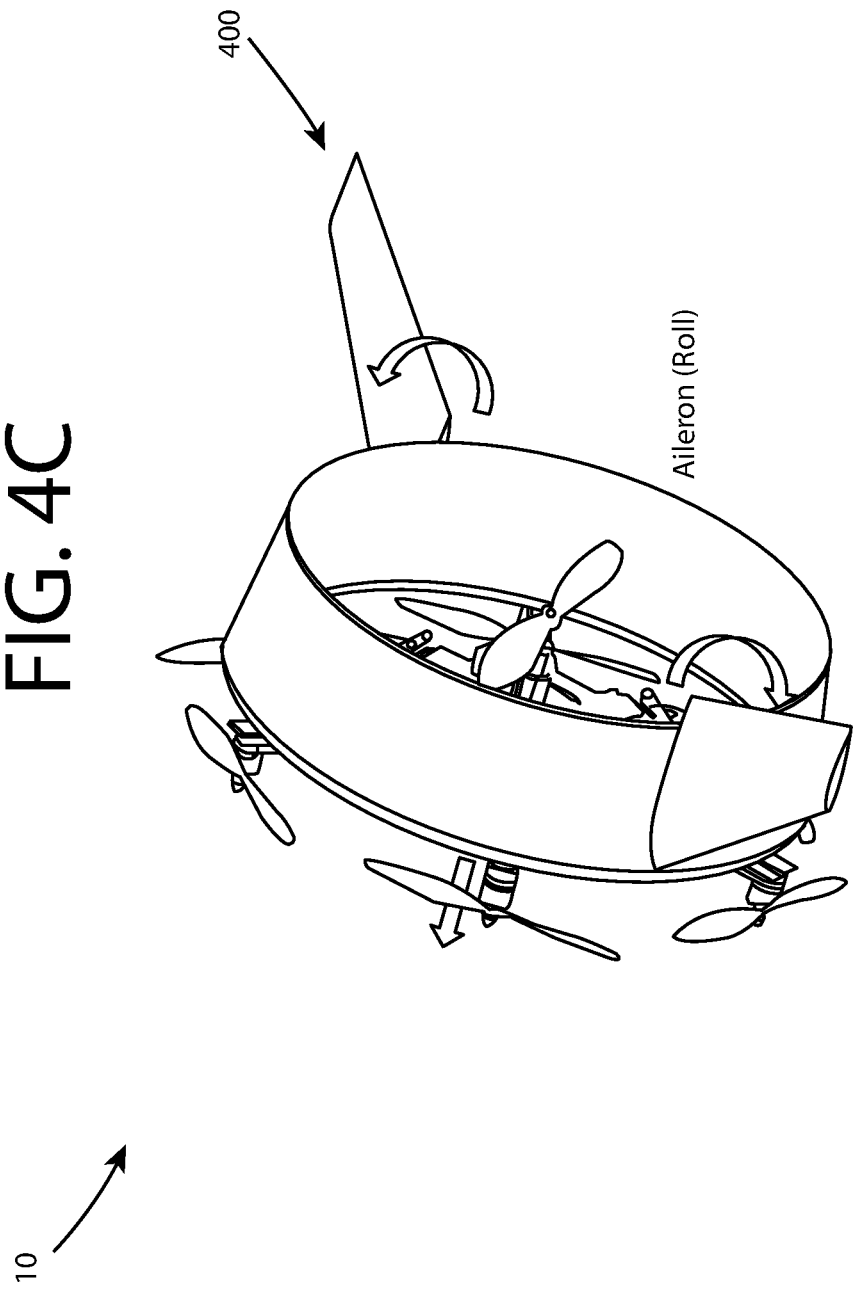
Figure 4D:
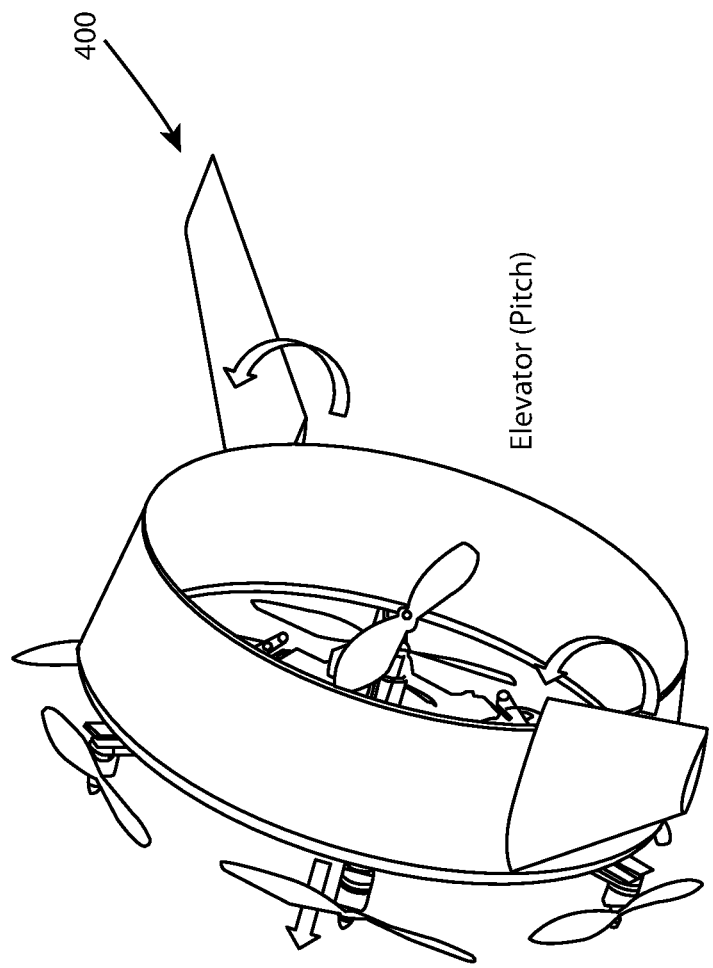

FIGS. 1-3 illustrate different views of UAV 10, according to an embodiment of the present invention. In some embodiments, UAV 10 includes a power generation system 12, a lift propeller 14, a micro-propeller assembly 16, and a ducted fan 20. Power generation system 12 is mechanically and/or electronically coupled between lift propeller 14 and micro-propeller assembly 16 and is more of a hybrid power system. See, for example, FIG. 7, which illustrates a power generation system 12, according to an embodiment of the present invention.

Figure 7:
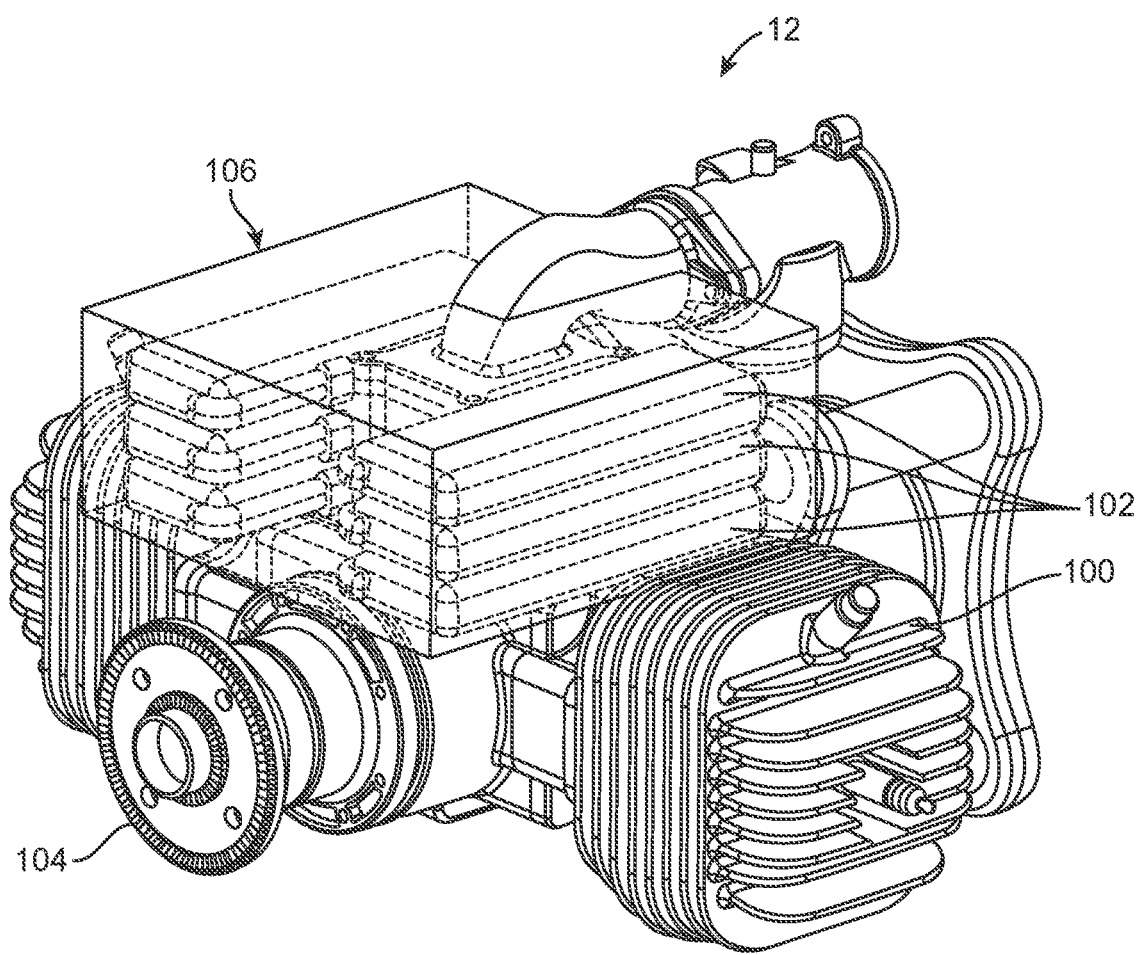
FIG. 7 illustrates a perspective view of a power generation system, according to an embodiment of the present invention.

As shown in FIG. 7, power generation system 12 includes an alternator 100, batteries 102, a combustion engine 104, and a thermal shroud 106. Combustion engine 104 is coupled to an alternator 100 and batteries 102 (e.g., an energy storage unit). Batteries 102 are enclosed within thermal shroud 106, which shields batteries 102 from heat generated by combustion engine 104. Thermal should 106 also shields batteries 102 from conditions external to UAV 10 during flight. This way, batteries 102 are not only protected from the heat, but also from any debris in the environment external to UAV 10.

During operation, combustion engine 104 is configured to drive alternator 100, which in turn charges batteries 102 during flight. Combustion engine 104, which drives alternator 100, is also configured to drive lift propeller 14 lifting UAV 10 in a vertical direction. When batteries 102 of UAV 10 reach a certain depth of discharge, the alternator begins to re-charge batteries 102 that drive micro-propellers 34 and possibly onboard sensors or payloads. During operation, batteries 102 are active at all times to maintain avionics health, and combustion engine 104 is configured to drive generator (or alternator) 100, which maintains charge in batteries 102. Combustion engine 104 is also configured to drive lift propeller 14 lifting UAV 10 in a vertical direction. UAV operation is maintained with batteries 102 upon loss of combustion engine functionality. In these embodiments, hand offs, switch-overs or "flight paths" would not be implied here. Rather, the combination of combustion engine 104 and batteries 102 operate together simultaneously. When the fuel supply is close to being depleted, no further charging of batteries 102 occur. In this case, UAV 10 operates solely with whatever power batteries 102 are capable of delivering. Of course, the remote pilot continues to monitor the status of the charge on batteries 102 and may land UAV 10 prior to complete loss of power.

Also, in certain embodiments, combustion engine 104 is a liquid-fuel based internal combustion engine comprising a hybrid-power design. This liquid-fuel based efficient hybrid-power design alleviates the need for intermediate refueling, allowing for continuous mission flight operations over longer distances and for longer periods of time.

It should be appreciated that batteries 102 may be charged by various techniques. In one example, batteries are charged by the energy created from alternator 106. In other embodiments, energy is harvested from conditions external to UAV 10 and stored in batteries 102. For example, when UAV is descending in altitude upon unexpected loss of power, the air entering the duct from below causes the lift propeller to autorotate. This forces the power generation system's shaft to turn, and the energy is captured and stored in batteries 102.

The combination of batteries 102 and combustion engine 104 enables long endurance and high efficiency flights. It is important to note, however, that alternative power generation system 12 configurations may be possible so long as those alternative systems are consistent with the embodiments described herein.

Returning to FIGS. 1-3, the charging of batteries 102 is used to power the on-board avionics and attitude control mechanisms of UAV 10 during flight, including without limitation sensors (not shown), electric motor 36 of micro-propeller assembly 16, or any other payload.

In some embodiments, micro-propeller assembly 16 may be mechanically and/or electronically coupled to ducted fan 20 around an upper portion 18 of ducted fan 20. Ducted fan 20 in some embodiments is mechanically and/or electronically coupled to power generation system 12.

Also, in certain embodiments, UAV 10 includes a landing gear 22 that is mechanically coupled at (or around) a lower portion 24 of ducted fan 20. Landing gear 22 may be housed in a gear compartment (not shown) upon take off. In other embodiments, landing gear 22 may be extended throughout flight.

UAV 10 may also include payload components and/or applications that are useful for carrying out a particular flight mission. For example, as shown in FIG. 1, UAV 10 includes payload components such as a laser range finder 26, a forward looking infrared (FLIR) camera 28, sensors (not shown), other mechanical/electrical plug-and-play-interface devices (not shown), and/or the like. In certain embodiments, laser range finder 26 may be a sensor or other mechanical or electrical plug-and-play interface device that determines the distance of, or detects, objects. In some embodiments, FLIR camera 28 is a sensor or other mechanical or electrical plug-and-play interface device that enables detection of infrared emissions used to perform intrusion detection, night-time search and rescue activities, image collection, and/or fire safety applications, and the like. It is important to note, however, that such payload components are for illustrative purposes only. Thus, UAV 10 is a platform that can host a wide range of payloads and/or applications.

As discussed above, in an embodiment, UAV 10 includes a pair of lifting wings 30 that provide lift and increase efficiency during forward flight. As shown in FIGS. 1-3, lifting wings 30 are mechanically coupled to an outer surface 32 of ducted fan 20. In some embodiments, lifting wings 30 pivot about an axis 210 (see FIG. 2) allowing UAV 10 to rotate from a horizontal direction to a vertical direction. For example, once vertical lift off has been accomplished, the remote pilot may send commands to pivot lifting wings 30, forcing UAV 10 to rotate 90 degrees and enabling forward flight. In certain embodiments, when UAV 10 is in a forward flight motion, both combustion engine 104 and batteries 102 may power UAV 10.

In some embodiments, such as that shown in FIGS. 4A-D, lifting wings 30 include control surfaces 400 for forward flight stability and control.

For purposes of explanation, control surfaces 400 are elevons that combine the functions of both ailerons and elevators to control the roll and pitch of UAV 10. In one example, the aileron (not shown) controls the roll of UAV 10, and the elevator (not shown) controls the pitch of UAV 10. In certain embodiments, a wing control mechanism (not shown) may control orientation of lifting wings 30. For purposes of explanation only, a servo is used to control orientation of lifting wings 30. In another example, actuators control orientation of control surfaces 400.

In other embodiments, however, lifting wings 30 may be alleviated from UAV 10 altogether. See, for example, FIG. 5. In the embodiments that do not include lifting wings 30, the UAV is not intended to change orientation. It should be noted that not all embodiments require or accommodate changing the UAV's orientation. It depends on the remote pilot's mission and application.

Figure 6:
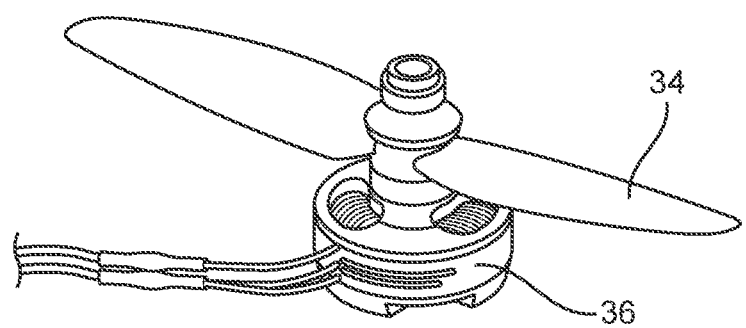
FIG. 6 illustrates a perspective view of a micro-propeller and electric motor coupled thereto, according to an embodiment of the present invention.

Although not illustrated, UAV 10 also includes a flight computer. In one example, the flight computer (also known as a flight controller) manages the speed (i.e., revolutions per minute) of micro-propeller 34, which is coupled to, and driven by, an electric motor 36 (see FIG. 6), based on a remote pilot's input commands. To accomplish this, the flight computer is electrically coupled to and assisted by various sensors (not shown) that augment flight computer calculations and help a pilot achieve the desired flight characteristics. Flight controller sensors may include an inertial measurement unit (gyro and accelerometer), barometer, magnetometer, and GPS global positioning satellite receiver among others, for the purposes of autonomous flight, flight safety, fault detection, automatically maintaining altitude and tuning flight performance.

A remote pilot's input commands may be received at the flight computer by way of a transceiver (not shown). In certain embodiments UAV 10 may include a transmitter and a receiver rather than transceiver. However, in the embodiments with a transceiver, the remote pilot's input commands are translated into control signals to control the speed of each electric motor 36 (see FIG. 6) of micro-propeller assembly 16.

In certain embodiments of UAV 10, the remote pilot may interpret telemetry and take action when a condition arises that flight software of the flight computer does not (or cannot) handle automatically. For example, this may occur during the unexpected loss of GPS (Global Positioning System) location signal, battery failure, or depletion of liquid fuel, to name a few.

The flight computer may also include a printed circuit board (PCB) or any other type of board, which may include battery, resistor, transistor, capacitor, inductor, diode, switch, chip, microprocessor, microcontroller, field programmable gate array, and/or memory components. Additionally, in certain embodiments, the flight computer may also be electrically coupled to other payloads of UAV 10.

Continuing with FIGS. 1-3, lift propeller 14 may be a variable pitch propeller, or any other propeller having the capability to function as the primary lift propeller of UAV 10. As discussed above, combustion engine 104 of the power generation system 12 may be coupled to lift propeller 14 and may drive lift propeller 14 during flight. Lift propeller 14, in some embodiments, produces a force in an upward direction (i.e., a force generally referred to as lift) that lifts UAV 10 from the ground. Lift propeller 14, however, may provide the additional benefit of autorotation in the event of combustion engine 104 or battery 102 failure or malfunction. This results in a more controlled gliding descent than is otherwise achievable with aircrafts that do not employ a lift propeller. This configuration also enables a remote pilot or flight controller of UAV 10 to minimize or avoid damage to UAV 10 (or other objects or people) upon landing.

As discussed earlier, should combustion engine 104 of UAV 10 fail or malfunction and the rotors of lift propeller 14 become free-spinning, UAV 10 may begin an immediate descend procedure where air enters the rotor system of lift propeller 14 from below. The upward flow of air from below the continuously spinning lift propeller 14 provides adequate thrust to maintain its rotational speed, a condition known as autorotation. This autorotation enables a pilot to land UAV 10 and protect any assets or objects in its landing path or reduce the fall of UAV 10 before impacting the ground to soften the landing.

Figure 8:
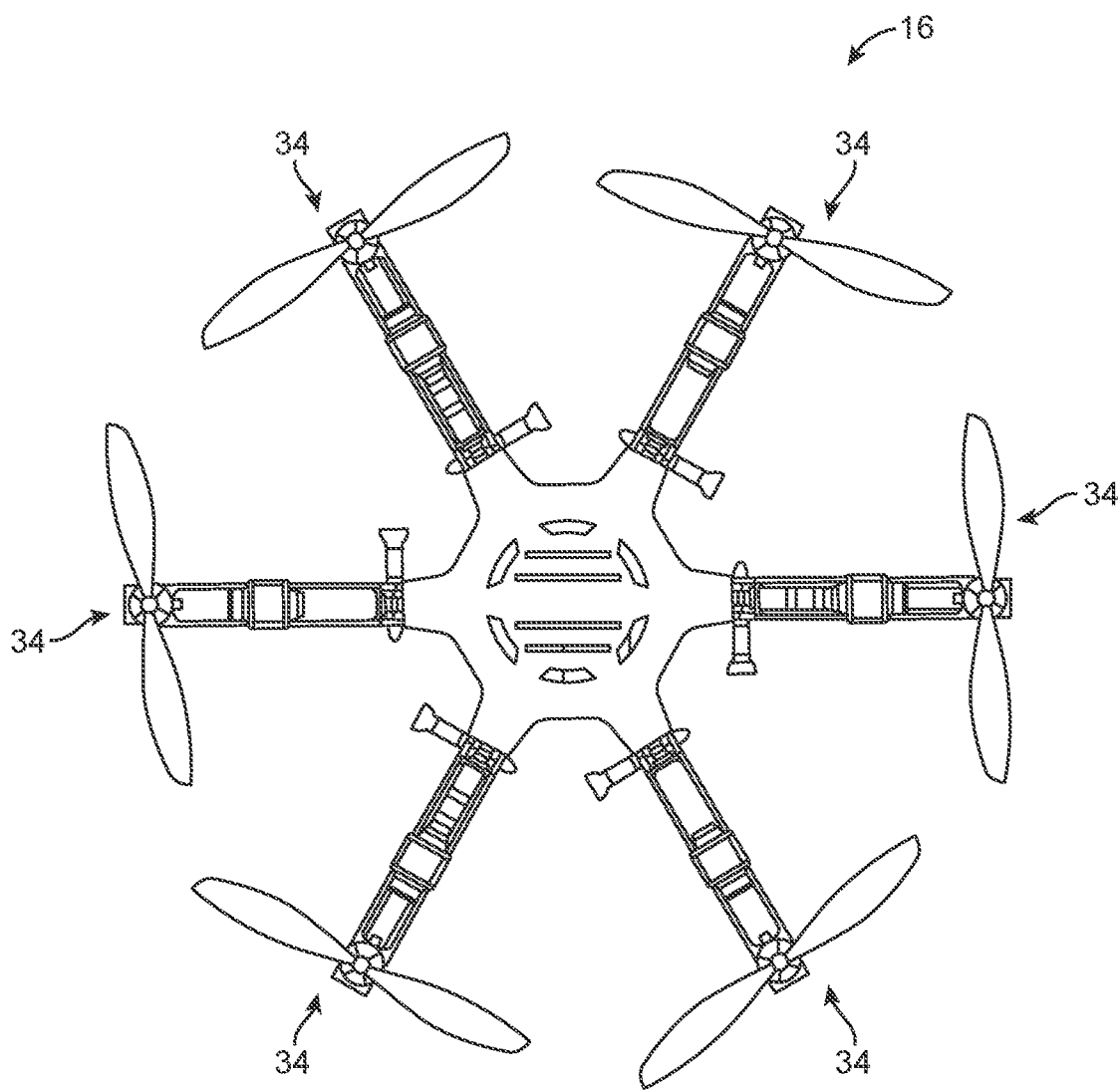
FIG. 8 illustrates a top view of a micro-propeller assembly, according to an embodiment of the present invention.

Turning now to FIG. 8 (and again to FIG. 6), micro-propeller assembly 16 may include a plurality of micro-propellers 34, each of which are coupled to electric motor 36 (see FIG. 6). Electric motors 36 in some embodiments are electric control motors that drives micro-propeller 34 and are coupled to and powered by batteries 102. Micro-propellers 34 are mounted at (or around) an upper portion 18 of ducted fan 20 to accept high-frequency control inputs not realizable by main ducted fan 20. See, for example, FIG. 3. The mounting of micro-propellers 34 counters the torque of the ducted fan 20

In some embodiments, electric motors 36 are configured in such a way to provide roll, pitch and yaw control. In some embodiments, right roll is achieved by increasing the RPM (revolutions per minute) of electric motors 36 on the left side of UAV 10 and/or decreasing the RPM of those on the right side of UAV 10. The opposite applies for left roll. Pitch forward (front of the vehicle pitches toward the ground) is achieved by increasing RPM on rear electric motors 36 and/or decreasing RPM on front electric motors 36. The opposite applies for aft pitch. Right yaw (vehicle spins in a plane parallel to the ground) is achieved by increasing or decreasing RPM on opposing motors 36, increasing or decreasing the torque in that pair's direction. The opposite applies for left yaw.

Figure 5:
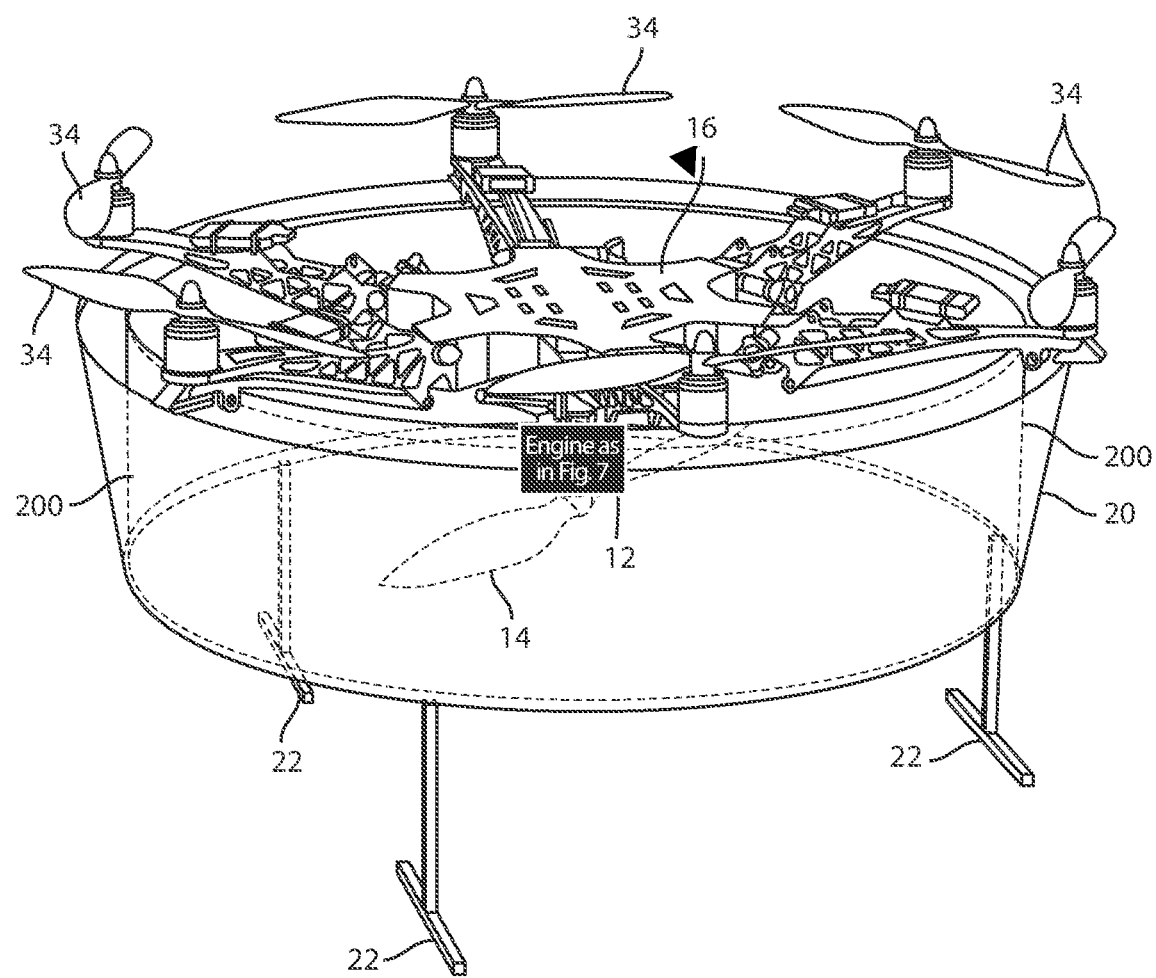
FIG. 5 illustrates a side perspective view of an UAV system without lifting wings, according to an embodiment of the present invention.

As shown in FIGS. 2, 3 and 5, ducted fan 20 may be double-walled. In an embodiment, the interior of ducted fan 20 serves as a fuel supply tank 200 for combustion engine 104. Although not shown in detail, since combustion engine 104 is centrally housed within ducted fan 20, a fuel supply line may connect supply fuel tank with combustion engine 104.

Ducted fan 20 may also provide efficient VTOL and forward flight propulsion capabilities of UAV 10. In some embodiments, the aerodynamics of the duct in ducted fan 20 preserves the structure of the flow, essentially keeping the structure conical. For example, by maintaining a conical shape (where the opening near the micro-propeller side is wider than the opening near the lift propeller) for the duct, efficiency is increased or at the very least maintained.

For hovering flight, traditional use has been to not reorient the UAV for forward flight and instead use an alternate propulsive mechanism to drive the UAV forward. In some embodiments, however, ducted fan 20 is reoriented such that drag during forward flight is produced while retaining the increase in efficiency from having the weight shaping that the duct provides. In certain embodiments, the wings pivot upon the command of the remote PIC controlling UAV 10.

Additionally, in some embodiments, ducted fan 20 and lift propeller 14 provide autorotation for UAV 10 in the event that engine 104 of the power generation system 12 fails. The VTOL capability of UAV 10 allows launching and landing of the UAV 10 in any location, thereby eliminating the need for runways and other prepared locations. This enables long endurance flight with the added benefit of VTOL.

The embodiments disclosed herein enable long endurance unmanned aircraft flight with the added benefit of VTOL. As previously discussed, conventional aircraft design-specific capabilities relating to VTOL constrain aircraft in a way that limits flight endurance. Various embodiments herein, however, combine VTOL capabilities with fixed-wing flight endurance to provide the capability for flight operations over longer distances and for longer periods of time.

In an embodiment, an UAV includes a power generation system, which includes an internal combustion engine and one or more batteries. The power generation system is configured to generate power for propulsion of the UAV. The internal combustion engine is configured to power a lift propeller, generating vertical lift of the UAV, and the batteries are configured to power a micro-propeller assembly, propelling the UAV in a forward direction or multiple additional directions.

In another embodiment, an UAV includes a power generation system that includes a liquid-fuel based internal combustion engine and one or more batteries to power the UAV. The power generation system is configured to generate power for propulsion of the UAV and charge the one or more batteries. The UAV includes a centrally housed ducted fan comprising a variable pitch lift propeller configured to provide lift to the UAV and autorotate the UAV when power to the ducted fan is eliminated.

In yet another embodiment, an UAV includes a power generation system configured to provide power to a lift propeller. The lift propeller is configured to generate vertical lift of the UAV. The UAV also includes a micro-propeller assembly configured to propel the UAV in a forward direction or multiple additional directions. The micro-propeller assembly includes a plurality of micro-propellers, each of which are distributed symmetrically around an upper portion of a centrally housed duct fan.

It will be readily understood that the components of various embodiments of the present invention, as generally described and illustrated in the figures herein, may be arranged and designed in a wide variety of different configurations. Thus, the detailed description of the embodiments of the present invention, as represented in the attached figures, is not intended to limit the scope of the invention as claimed, but is merely representative of selected embodiments of the invention.

The features, structures, or characteristics of the invention described throughout this specification may be combined in any suitable manner in one or more embodiments. For example, reference throughout this specification to "certain embodiments," "some embodiments," or similar language means that a particular feature, structure, or characteristic described in connection with the embodiment is included in at least one embodiment of the present invention. Thus, appearances of the phrases "in certain embodiments," "in some embodiment," "in other embodiments," or similar language throughout this specification do not necessarily all refer to the same group of embodiments and the described features, structures, or characteristics may be combined in any suitable manner in one or more embodiments.

It should be noted that reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention can be practiced without one or more of the specific features or advantages of a particular embodiment. In other instances, additional features and advantages may be recognized in certain embodiments that may not be present in all embodiments of the invention.

One having ordinary skill in the art will readily understand that the invention as discussed above may be practiced with steps in a different order, and/or with hardware elements in configurations which are different than those which are disclosed. Therefore, although the invention has been described based upon these preferred embodiments, it would be apparent to those of skill in the art that certain modifications, variations, and alternative constructions would be apparent, while remaining within the spirit and scope of the invention. In order to determine the metes and bounds of the invention, therefore, reference should be made to the appended claims.

The invention claimed is:

1. An unmanned aerial vehicle (UAV), comprising:
 a power generation system comprising an internal combustion engine and one or more batteries (batteries), configured to generate power for propulsion of the UAV, wherein the batteries and the internal combustion engine are abutting each other, the internal combustion engine is mechanically linked to a lift propeller, and is configured to mechanically drive the lift propeller, generating vertical lift of the UAV, the batteries are configured to electrically rotate a micro-propeller assembly, propelling the UAV in a forward direction or multiple additional directions, the internal combustion engine and the batteries are decoupled from one another, independently mechanically rotating the lift propeller by the internal combustion engine and independently electrically rotating the micro-propeller assembly by the batteries, and the lift propeller and the micro-propeller assembly are located within a diameter of a ducted fan.

2. The UAV of claim 1, wherein the power generation system is mechanically or electronically coupled to, and between, the lift propeller and the micro-propeller assembly.

3. The UAV of claim 1, wherein the power generation system further comprises a thermal shroud to enclose the batteries abutted next to the internal combustion engine, creating a thermal insulation between the batteries and the internal combustion engine.

4. The UAV of claim 1, wherein the power generation system further comprises an alternator driven by the internal combustion engine, and is configured to charge the batteries during flight.

5. The UAV of claim 1, wherein the internal combustion engine and the batteries are configured to operate simultaneously during flight.

6. The UAV of claim 5, wherein the batteries are configured to solely operate without the internal combustion engine when fuel supply on the UAV is insufficient to sustain operation of the internal combustion engine and lift propeller.

7. The UAV of claim 1, wherein the batteries are configured to store energy harvested from conditions external to the UAV, when the conditions external to the UAV force a shaft on the power generation system to turn.

8. The UAV of claim 1, wherein the batteries are configured to power on-board avionics and attitude control mechanisms, each motor of the micro-propeller assembly, and a payload on the UAV during flight.

9. The UAV of claim 1, wherein the lift propeller is a variable pitch lift propeller.

10. The UAV of claim 1, wherein the lift propeller is configured to produce a force in an upward direction that lifts the UAV from the ground.

11. The UAV of claim 1, wherein the lift propeller is housed in the ducted fan, the ducted fan is centrally located.

12. The UAV of claim 11, wherein the lift propeller is configured to perform autorotation when power to the ducted fan is eliminated either intentionally or through internal combustion engine or battery failure.

13. The UAV of claim 1, wherein the micro-propeller assembly is mechanically and/or electronically coupled to a ducted fan around an upper portion of the ducted fan.

14. The UAV of claim 13, wherein the ducted fan is mechanically and/or electronically coupled to the power generation system.

15. The UAV of claim 13, wherein the micro-propeller assembly comprises a plurality of micro-propellers, each of which are coupled to an electric motor.

16. The UAV of claim 15, wherein each electric motor is coupled to the batteries, and is configured to rotate a corresponding one of the plurality of micro-propellers and to provide roll, pitch, and yaw control.

17. The UAV of claim 15, wherein each of the plurality of micro-propellers are mounted at or around an upper portion of the ducted fan to accept variable pitch control inputs not realizable by the ducted fan.

18. The UAV of claim 17, wherein each of the plurality of micro-propellers are configured to counter torque produced by the ducted fan.

19. The UAV of claim 1, further comprises a ducted fan that is centrally located on the UAV.

20. The UAV of claim 19, wherein the ducted fan comprises a double wall, storing fuel supply within interior of the double wall.

21. The UAV of claim 19, wherein the ducted fan forms a conical shape, narrowing towards the distal end of the ducted fan.

22. The UAV of claim 21, wherein the conical shape of the ducted fan is configured to reduce drag during forward flight.

23. The UAV of claim 1, further comprising:

a pair of lifting wings to provide lift and increase efficiency during forward flight of the UAV, wherein the pair of lifting wings are mechanically coupled to an outer surface of a ducted fan.

24. The UAV of claim 23, wherein the pair of lifting wings pivot about an axis allowing the UAV to rotate from a horizontal direction to a vertical direction and visa-versa.

25. The UAV of claim 24, wherein each of the pair of wings comprise a control surface combine functions of both ailerons and elevators to control roll and pitch of the UAV.

26. An unmanned aerial vehicle (UAV), comprising:

a power generation system comprising of a liquid-fuel based internal combustion engine and one or more batteries to power the UAV, wherein the one or more batteries and the liquid-fuel based internal combustion engine are abutting each other, the power generation system is configured to mechanically drive propulsion of the UAV and electrically drive the one or more batteries, a centrally housed ducted fan comprising a variable pitch lift propeller configured to provide lift to the UAV and autorotate the UAV when power to the ducted fan is eliminated, the liquid-fuel based internal combustion engine and the one or more batteries are decoupled from one another, independently mechanically rotating the variable pitch lift propeller by the liquid-fuel based internal combustion engine and independently electrically rotating a micro-propeller assembly by the batteries, and the variable pitch lift propeller and a micro-propeller assembly are located within a diameter of a ducted fan.

27. An unmanned aerial vehicle (UAV), comprising:

a power generation system comprising an internal combustion engine mechanically connected to the lift propeller, and configured to mechanically drive to a lift propeller, wherein the lift propeller is configured to generate vertical lift of the UAV; and one or more batteries configured to electrically rotate a micro-propeller assembly, wherein the micro-propeller assembly configured to propel the UAV in a forward direction or multiple additional directions, wherein the micro-propeller assembly comprises a plurality of micro-propellers, each of which are distributed symmetrically around an upper portion of a centrally housed duct fan, the internal combustion engine and the one or more batteries are decoupled from one another, independently mechanically rotating the variable pitch lift propeller by the internal combustion engine and independently electrically rotating the micro-propeller assembly by the one or more batteries, and the lift propeller and the micro-propeller assembly are located within a diameter of a ducted fan.

* * * * *